(12) United States Patent
Ciciriello et al.

(10) Patent No.: US 11,674,547 B2
(45) Date of Patent: Jun. 13, 2023

(54) RESONANCE VIBRATION CONTROL METHOD AND SYSTEM

(71) Applicant: ROLLS-ROYCE PLC, London (GB)

(72) Inventors: Lucia Ciciriello, Berlin (DE); Mark S King, Derby (GB)

(73) Assignee: ROLLS-ROYCE plc, London (GB)

( * ) Notice: Subject to any disclaimer, the term of this patent is extended or adjusted under 35 U.S.C. 154(b) by 215 days.

(21) Appl. No.: 16/173,145

(22) Filed: Oct. 29, 2018

(65) Prior Publication Data

US 2019/0128324 A1   May 2, 2019

(30) Foreign Application Priority Data

Nov. 1, 2017 (GB) ..................... 1718068

(51) Int. Cl.
*F02C 6/00* (2006.01)
*F01D 25/16* (2006.01)
(Continued)

(52) U.S. Cl.
CPC ............ *F16C 19/527* (2013.01); *B64D 41/00* (2013.01); *F01D 15/10* (2013.01); *F01D 25/04* (2013.01); *F01D 25/164* (2013.01); *F02C 6/00* (2013.01); *F04D 29/059* (2013.01); *F16C 17/02* (2013.01); *F16C 17/024* (2013.01); *F16C 17/026* (2013.01); *F16C 17/028* (2013.01); *F16C 17/03* (2013.01); *F16C 19/00* (2013.01); *F16C 32/0442* (2013.01); *F16C 32/0444* (2013.01); *F16C 32/0446* (2013.01); *F16C 32/0476* (2013.01); *F16C 32/0489* (2013.01); *F16C 32/0614* (2013.01); *F16C 41/004* (2013.01); *H02P 9/105* (2013.01); *H02P 23/04* (2013.01);
(Continued)

(58) Field of Classification Search
CPC ........ F01D 15/10; F01D 25/04; F01D 25/164; F02C 6/00; F16C 17/02; F16C 19/627; F16C 32/0614; F16C 32/0446; F16C 32/0476
See application file for complete search history.

(56) References Cited

U.S. PATENT DOCUMENTS 3,037,573 A * 6/1962 Larsen .................... F16F 15/10
180/381
3,937,533 A * 2/1976 Veillette ............. F16C 32/0476
310/90.5
(Continued)

FOREIGN PATENT DOCUMENTS

KR       20010059207 A   *   7/2001

OTHER PUBLICATIONS

English Language Translation of KR-20010059207-A (translation Date Apr. 2021) Attached to KR-20010059207 (Year: 2001).*
(Continued)

*Primary Examiner* — Christopher R Legendre
(74) *Attorney, Agent, or Firm* — Oliff PLC

(57) ABSTRACT

A bearing arrangement includes a shaft, at least one contact bearing and at least one non-contact bearing and a controller. The controller is configured to control a magnitude of a restoring force applied to the shaft by the non-contact bearing in accordance with a sensed parameter such that a stiffness of the shaft is modified such that one or more resonance frequencies of the shaft are moved away from one or more external forcing frequencies.

16 Claims, 5 Drawing Sheets

(51) Int. Cl.

| | |
|---|---|
| *F01D 25/04* | (2006.01) |
| *F16C 19/52* | (2006.01) |
| *H02P 23/04* | (2006.01) |
| *F16C 32/06* | (2006.01) |
| *F16C 19/00* | (2006.01) |
| *F16C 32/04* | (2006.01) |
| *F16C 17/02* | (2006.01) |
| *F16C 17/03* | (2006.01) |
| *H02P 9/10* | (2006.01) |
| *B64D 41/00* | (2006.01) |
| *F01D 15/10* | (2006.01) |
| *F04D 29/059* | (2006.01) |
| *F16C 41/00* | (2006.01) |
| *H02P 101/25* | (2016.01) |
| *F16C 19/06* | (2006.01) |

(52) U.S. Cl.
CPC .... *F05D 2220/323* (2013.01); *F05D 2220/76* (2013.01); *F05D 2240/51* (2013.01); *F05D 2270/333* (2013.01); *F16C 19/06* (2013.01); *F16C 2233/00* (2013.01); *F16C 2360/23* (2013.01); *F16C 2380/27* (2013.01); *H02P 2101/25* (2015.01)

(56) References Cited

U.S. PATENT DOCUMENTS

| | | | | |
|---|---|---|---|---|
| 5,345,127 | A * | 9/1994 | New | F16C 32/0402 |
| | | | | 310/90.5 |
| 5,347,190 | A | 9/1994 | Lewis et al. | |
| 5,749,700 | A * | 5/1998 | Henry | F16C 32/0459 |
| | | | | 415/104 |
| 5,867,979 | A * | 2/1999 | Newton | F02C 3/113 |
| | | | | 60/226.1 |
| 5,977,677 | A * | 11/1999 | Henry | F16C 39/02 |
| | | | | 310/90.5 |
| 6,378,293 | B1 * | 4/2002 | Care | F02C 7/06 |
| | | | | 60/226.1 |
| 6,407,475 | B1 * | 6/2002 | Care | F16C 25/06 |
| | | | | 310/90.5 |
| 6,577,664 | B1 | 6/2003 | Nara et al. | |
| 8,028,513 | B2 * | 10/2011 | Norris | F02C 3/073 |
| | | | | 60/226.1 |
| 9,494,048 | B1 * | 11/2016 | Parnin | F16F 15/0237 |
| 2004/0022653 | A1 | 2/2004 | Brunet et al. | |
| 2009/0015012 | A1 | 1/2009 | Metzler et al. | |
| 2010/0247010 | A1 | 9/2010 | Lee et al. | |
| 2015/0117803 | A1 | 4/2015 | Haile et al. | |
| 2015/0167687 | A1 | 6/2015 | Kurihara et al. | |
| 2015/0251649 | A1 | 9/2015 | Liang et al. | |
| 2017/0170763 | A1 | 6/2017 | Blackwelder et al. | |
| 2019/0128324 | A1 * | 5/2019 | Ciciriello | F01D 15/10 |

OTHER PUBLICATIONS

Okubo, Nobyuku and Toi, Takeshi. "Sensitivity Analysis and its appliacation for dynamic improvement". Sadhana, vol. 25, Part 3, Jun. 2000, pp. 291-303. (Year: 2000).*

Wahyuni, Endah and Ji, Tianjian. "Relationship between Static Stiffness and Modal Stiffness of Structures". IPTEK, The Journal for Technology and Science, vol. 21, No. 2, May 2010. (Year: 2010).*

U.S. Appl. No. 16/175,938, filed Oct. 31, 2018 in the name of Lucia Ciciriello et al.

May 1, 2018 Search Report issued in British Patent Application No. 1718068.8.

Feb. 18, 2019 Extended Search Report issued in European Patent Application No. 18203281.3.

Feb. 19, 2019 Extended Search Report issued in European Patent Application No. 18203500.6.

Apr. 28, 2021 Office Action issued in European Patent Application No. 18 203 281.3.

* cited by examiner

RESONANCE VIBRATION CONTROL METHOD AND SYSTEM

The present disclosure concerns a method of controlling vibration in a rotating shaft assembly, particularly though not exclusively, in the context of gas turbine engines and electrical motors.

Gas turbine engines comprise one or more rotating shafts, on which compressors and/or turbines are mounted to provide for rotation of these components. In general, at least two bearings are provided to allow for rotation of the shafts. In some cases, several shafts are provided, which may be coaxial, i.e. with two or more shafts rotating about a common axis. Similar arrangements are also provided in other machine types.

Two types of bearings are known for providing rotatable support of shafts—contact bearings and non-contact bearings. Contact bearings comprise either plain bearings (also known as "journal bearings") or rolling bearings. In contact bearings, there is a physical contact between elements to provide for support of the shaft.

Such bearings are designed in order to provide the forces to react large radial and axial shaft loads. Non-contact bearings are also known.

Examples include magnetic bearings and air bearings. In magnetic bearings, support is provided by opposing magnetic fields provided by the bearing elements. In air bearings, air pressure supports the bearing elements. In non-contact bearings the forces necessary to support the shaft are generated without physical contact between relatively rotatable components in normal use. Non-contact bearings are highly efficient, since they reduce friction compared to contact bearings. However, they may have limitations in terms of load and installation adaption, and provide relatively little damping in use, unless this is deliberately generated by a control system active damping feature.

Whichever bearing system is used, a common problem is controlling the level of vibration. Vibration may be caused by imbalances of the shaft and supported rotatable elements, such as compressor and turbine discs and blades, and also external forcing such as aircraft manoeuvres and aerodynamic forces. Damping systems such as fluid dampers are commonly employed to reduce vibrations.

Vibrations are particularly pronounced at particular rotational speeds/frequencies, known as "critical" speeds, in view of resonances of the rotating system.

At the critical speeds the system vibrates in resonance, a condition at which vibrations are sustained by the system internal vibratory response, and may exceed the capability of the damping system, therefore causing damage to components. The damping system may also have a relatively high weight, and may be prone to failure. It should be noted that damping systems reduce the effects of the resonances without eliminating the cause, which is due to the coincidence between external forces and system internal vibratory response frequency. It should also be noted that at given unbalance and external forcing levels, the vibrations in resonance are determined by the stiffness to inertia distribution of the whole arrangement.

In the field of gas turbine engines, weight is an important consideration. Consequently, large damping systems cannot be employed. As a partial solution, "keep-out zones" to allow only a fast transit of the critical speeds are employed. Keep-out zones are shaft rotational speeds that are restricted from use, to prevent damage from occurring due to high vibrational forces as a result of system resonances. These keep-out zones can restrict operation of the aircraft. It should also be noted the vibration in resonance may be very detrimental for rotating coupling, bending and gear trains.

According to a first aspect there is provided a bearing arrangement comprising: a shaft;
at least one contact bearing and at least one non-contact bearing;
a controller configured to control a magnitude of a restoring force applied to the shaft by the non-contact bearing in accordance with a sensed parameter such that a stiffness of the shaft is modified such that one or more resonance frequencies of the shaft are moved away from one or more external forcing frequencies.

Advantageously, shaft stiffness can be dynamically altered during operation, such that one or more resonant frequencies of the shaft can be moved away from the external forcing frequencies at different operational speeds. Consequently, the cause of vibrations can be reduced or eliminated and the vibration induced damage reduced in the whole operational envelope.

The contact bearings may comprise one of a journal bearing and a rolling bearing such as roller bearings, ball bearings, spherical bearings and taper bearings.

The non-contact bearing may comprise one of a magnetic bearing and an air bearing.

Where the non-contact bearing comprises a magnetic bearing, the controller may be configured to control voltage and/or current through one or more bearing magnetic windings to control the restoring force. Where the non-contact bearing comprises an air bearing, the controller may be configured to control air pressure and/or air flow to control the restoring force.

The sensed parameter may comprise one or more of a shaft displacement, a shaft speed and a shaft rotational or vibrational frequency. The controller may be configured to utilise one or more sensitivity parameters based on a model of the shaft and/or further components which relates sensed shaft speeds and/or vibrations to a bearing restoring force magnitude required to achieve a demanded stiffness variation. The controller may be configured to utilise the sensitivity parameters to generate a calculated restoring force to adjust the sensitivity parameters to the measured conditions, such that the one or more resonant frequencies lie away from the sensed driving frequency by a target frequency difference. Advantageously, the non-contact bearing can be controlled to move the resonance away from the current operating conditions, thereby preventing resonances from arising, thereby reducing vibration eliminating the cause.

Alternatively or in addition, the sensed parameter may comprise a vibrational displacement of the shaft. The controller may be configured to alter the restoring force to a value that results in a minimum vibrational displacement.

The bearing arrangement may comprise two or more non-contact bearings located at different positions along the shaft, and may comprise two or more contact bearings located at different positions along the shaft. At least one of the non-contact bearings may be provided at a position between two contact bearings. Advantageously, the non-contact bearing can have a large impact on shaft stiffness by locating the non-contact bearing between two contact bearings, i.e. on an otherwise unsupported portion of the shaft.

The controller may be configured to adjust the restoring forces of one or more of the non-contact bearings independently of the other, in accordance with the model.

According to a second aspect, there is provided a method of controlling a bearing arrangement supporting a shaft, the bearing arrangement comprising at least one contact bearing and at least one non-contact bearing, the method comprising: controlling a magnitude of a restoring force applied to the shaft by the non-contact bearing in accordance with a sensed parameter such that a stiffness of the shaft is modulated such that a resonant shaft rotational frequency is moved away from a driving frequency.

According to a third aspect, there is provided a gas turbine engine comprising a bearing arrangement in accordance with the first aspect.

The gas turbine engine may comprise at least one compressor and at least one turbine interconnected by a main engine shaft. The main engine shaft may comprise the shaft of the bearing arrangement.

The gas turbine engine may comprise two or more main engine shafts, which may interconnect respective turbines and compressors. The main engine shafts may be co-axial.

The gas turbine engine may comprise a reduction gearbox, which interconnects a fan drive turbine and a fan via respective input and output shafts. The reduction gearbox may comprise a planetary gearbox comprising a sun gear, multiple planet gears, a planet carrier and a ring gear, each supported by respective shafts. The shaft of the bearing arrangement may comprise one or more of the sun shaft, the planet carrier shaft, the ring gear shaft and one or more planet shafts.

The engine may comprise an accessory gearbox coupled to one or more of the main shafts via an accessory shaft, and configured to drive one or more engine accessories. The shaft of the bearing arrangement may comprise the accessory shaft.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
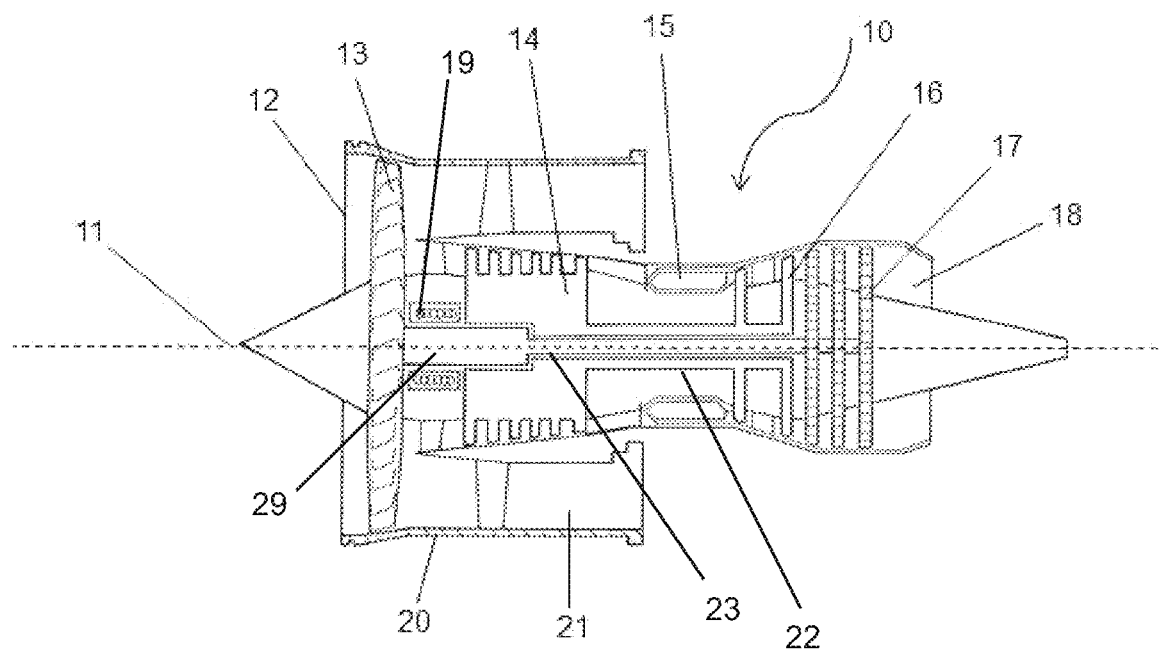
FIG. 1 is a sectional side view of a gas turbine engine.
Figure 2:
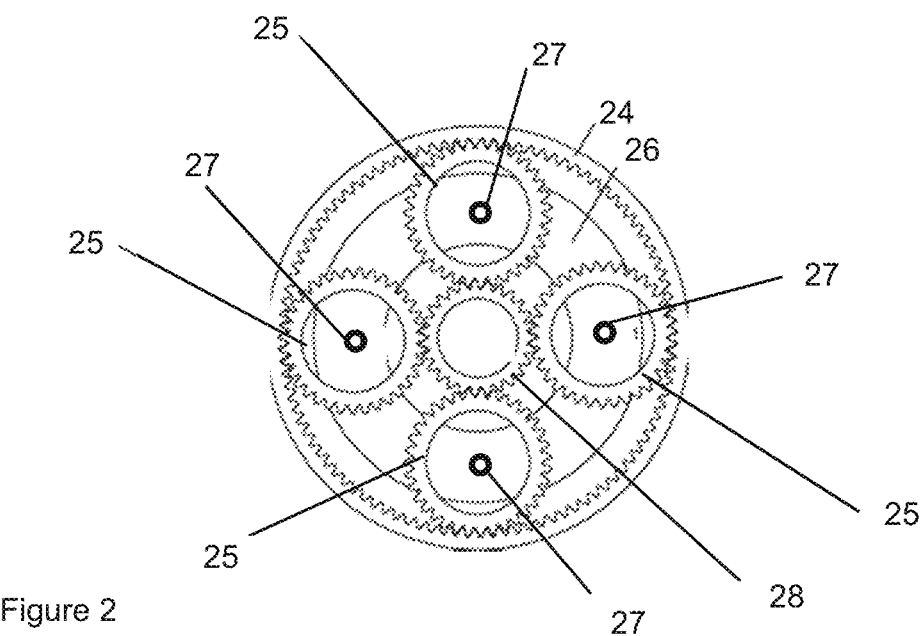
FIG. 2 is a sectional front view of a reduction gearbox of the gas turbine engine of FIG. 1.

With reference to FIG. 1, a gas turbine engine is generally indicated at 10, having a principal and rotational axis 11. The engine 10 comprises, in axial flow series, an air intake 12, a propulsive fan 13, a gearbox 19, a compressor 14, combustion equipment 15, a high-pressure turbine 16, a low-pressure turbine 17 and an exhaust nozzle 18. A nacelle 20 generally surrounds the engine 10 and defines the intake 12 and a bypass passage 21.

The gas turbine engine 10 works in the conventional manner so that air entering the intake 12 is accelerated by the fan 13 to produce two air flows: a first air flow into the intermediate pressure compressor 15 and a second air flow which passes through a bypass duct 22 to provide propulsive thrust. The compressor 14 compresses the air flow directed into it before delivering that air to combustion equipment 15 where it is mixed with fuel and the mixture combusted. The resultant hot combustion products then expand through, and thereby drive the high 16 and low-pressure 17 turbines before being exhausted through the nozzle 18 to provide additional propulsive thrust. The high 16 and low 17 pressure turbines drive respectively the compressor 14 and the fan 13 via the gearbox 14. A high pressure shaft 22 extends between the high pressure turbine 16 and the compressor 14, while a low pressure shaft 23 extends between the low pressure turbine 17 and an input of the gearbox 14.

The gearbox 14 is a reduction gearbox in that it gears down the rate of rotation of the fan 13 by the low pressure turbine 17. The gearbox 14 is an epicyclic planetary gearbox having a static ring gear 24, rotating and orbiting planet gears 25 supported by a planet carrier 26 via respective planet pins 27, and a rotating sun gear 28. The sun gear 28 is coupled to the low pressure shaft 23, and so acts as an input to the gearbox 14, while the planet carrier 26 is coupled to a fan shaft 29, and so acts as an output from the gearbox 14.

One or more of the shafts 22, 23, 29 and gearbox components, such as the planet pins 27, carrier 26 and sun gear 28, are supported by a bearing arrangement 30.

Figure 3:
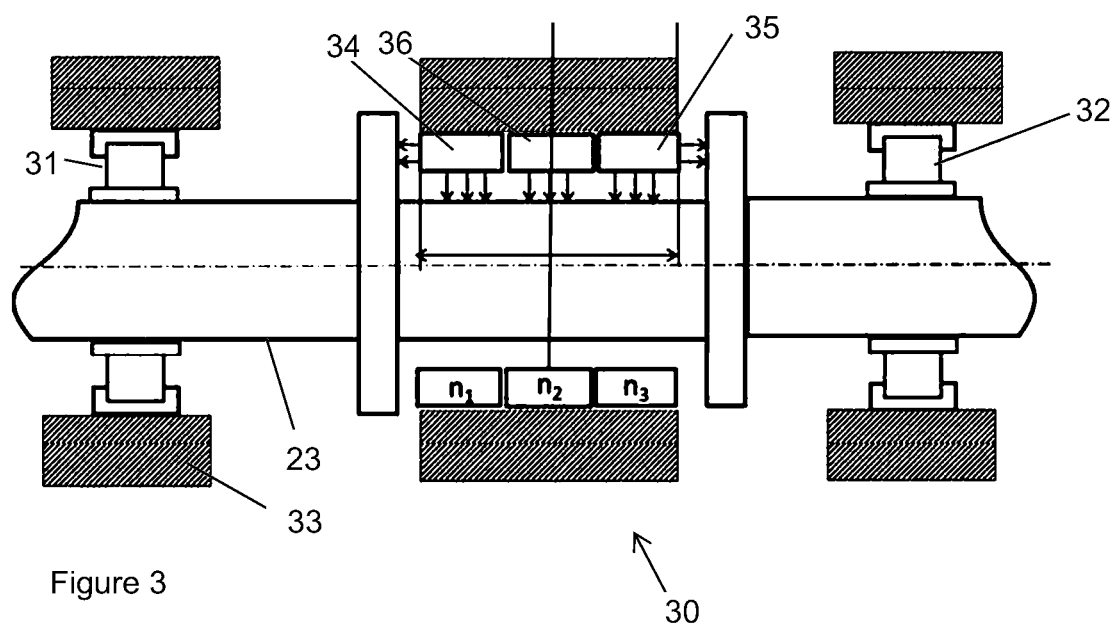
FIG. 3 is a sectional side view of a bearing arrangement of the gas turbine engine of FIG. 1.

Referring to FIG. 3, a bearing arrangement 30 is shown. In this embodiment, the bearing arrangement is described in relation to the low pressure shaft 23, though it will be understood that the low pressure shaft could be substituted for one or more other shafts or rotatable components of the engine, or indeed for a rotatable component of a machine other than a gas turbine engine.

The arrangement 30 comprises first and second contact bearings 31, 32 which are axially spaced from one another. The contact bearings 31, 32 are in the form of cylindrical roller bearings, though it will be understood that other suitable types of contact bearings could be employed, such as ball bearings. It will also be understood that further contact bearings may be provided, for example, to react axial loads. In some instances, only a single contact bearing may be employed.

Each of the bearings 31, 32 is mounted to static structure 33 of the engine 10, such as housings etc, to support the shaft 23 relative to the remainder of the engine 10, while allowing for rotation of the shaft.

The bearing arrangement 30 further comprises one or more non-contact bearings. In this embodiment, three non-contact bearings are provided, which are each in the form of magnetic bearings 34, 35, 36.

Figure 4:
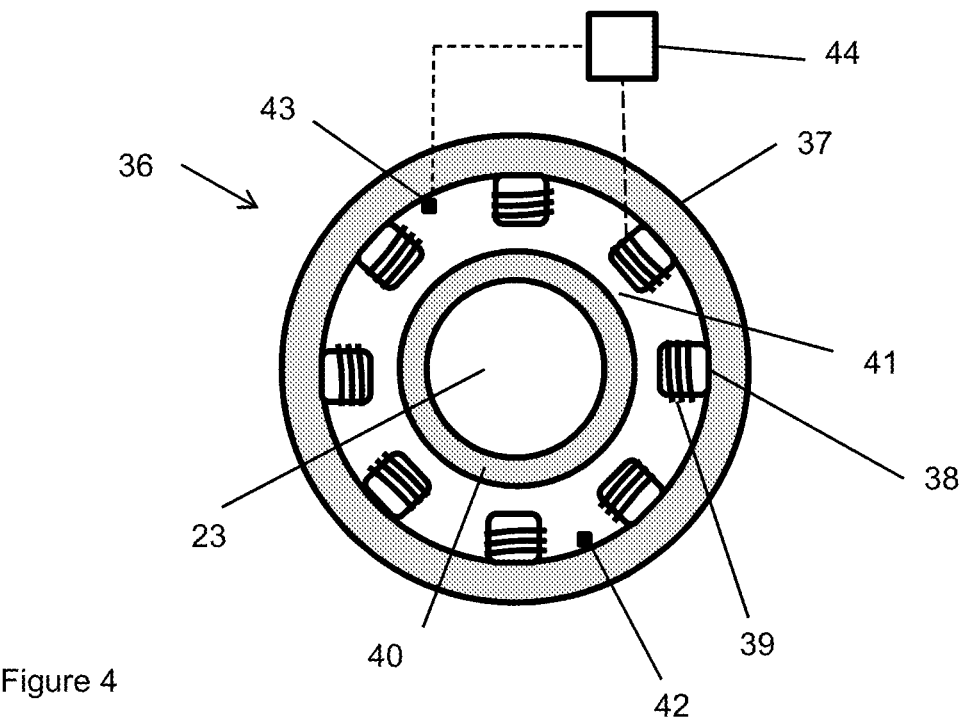
FIG. 4 is a sectional front view of a magnetic bearing of the bearing arrangement of FIG. 3.

One of the magnetic bearings 36 is shown in more detail in FIG. 4. The magnetic bearing 36 comprises an annular stator 37, which is typically formed of a soft magnetic material, and may comprise a plurality of laminations. A plurality of salient teeth 38 project inwardly from the stator 37. Stator windings 39 are wound round each stator, and are coupled to an electrical power supply such as a generator or battery (not shown). The stator 37 and teeth 38 surround the shaft 23, which comprises a rotor lamination 40 therearound. The rotor lamination 40 rotates with the shaft 23, and comprises a magnetic material such as iron.

In use, magnetic fields produced by the windings 39 in view of electrical current within the windings 39 interact with the rotor lamination 40 magnetic field to create a restoring force F between the shaft 23 and the stator 37. The force F acts to support the shaft 23 against the force of gravity and other accelerations, such that an air gap 41 is maintained in use. Consequently, the shaft 23 is free to rotate, and is at least partly supported by the non-contact bearing 36, in addition to the contact bearings 31, 32.

However, in general, the restoring force of the non-contact bearing is generally relatively small in comparison to the reaction force that the contact bearings 31, 32 are capable of generating.

The magnetic bearing further comprises one or more sensors 42, 43, which are configured to sense one or more sensed parameters of the bearing system 30. Optionally, these sensors 42, 43 include a shaft speed sensor 42, a shaft vibrational magnitude sensor 43, and a shaft temperature sensor. Examples of suitable speed sensors include Hall effect sensors, optical sensors (such as a phonic wheel), etc. as would be available to the skilled person. Similarly, vibrational sensors configured to sense the magnitude of the air gap 41 would be available to the skilled person.

The windings 39 and one or more sensors 42, 43 are electrically coupled to a controller 44. The controller 44 is configured to control the magnitude of the restoring force F generated by the magnetic bearing 36 in accordance with parameters determined by the sensors 43 such that a stiffness of the shaft 23 is modified such that, in turn, one or more resonance frequencies $f_n$ of the shaft 23 are moved away from one or more external forcing frequencies.

In use, the shaft 23 will typically be subject to vibration. This vibration is a result of driving forces, which will have one or more frequencies and harmonics. The bearing system 30 (and the engine 10 as a whole) similarly has a natural frequency and one or more harmonics, as is familiar to the skilled person. Where one or more driving frequencies match the system natural frequencies a resonance occurs. In this situation, vibrational magnitudes can increase rapidly as the driving and response frequencies more closely match. This large increase in vibration can cause engine damage, and must be prevented. One component of the driving frequencies is related to shaft rotational speeds, since shaft imbalances (either due to mass imbalance, or directional aerodynamic forces) are a common and large contributor to the vibrational input. However, it will be recognised that other components may also be present, such as aerodynamic and maneuvering loads.

Figure 7:
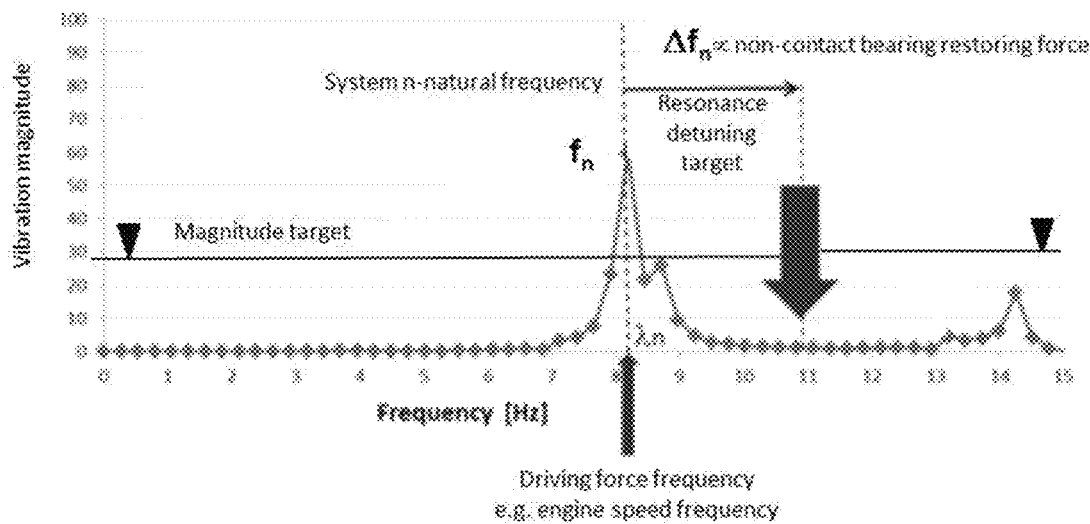
FIG. 7 is a graph showing vibration relative to shaft rotational speed before stiffness is modified.

FIG. 7 shows a graph relating driving frequencies and vibrational magnitude for a given driving force. As can be seen, the vibrational magnitude of the shaft 23 is highly dependent on the frequency of the driving vibration, with peaks coinciding with driving frequencies of 11 and 17 Hz. Consequently, where operating conditions (shaft rotational speed, aerodynamic force etc.) are such that the driving frequency coincides with one of the peaks (i.e. a resonant frequency of the system), large vibrations will occur. These vibrational magnitudes can conventionally be reduced by damping. Damping absorbs some of the vibrational energy, and converts this into heat. However, in order to absorb large amounts of vibrational energy, large damping forces are required.

Furthermore, while damping may reduce the peak vibrational magnitude, it does not in general change the natural frequency of the system—rather, damping "flattens out" the curve, such that forcing at frequencies lying adjacent the natural frequency result in increased vibrations (since the Q factor of the system is reduced). Consequently, keep-out zones may be increased by damping.

The bearing arrangement 30 seeks to avoid this problem by dynamically altering shaft stiffness during operation of the engine 10, by altering non-contact bearing 34, 35, 36 restoring forces in accordance with one or more sensed parameters which are indicative of one or more driving frequency. Consequently, the present system alters the natural frequencies of the system, so that reduced damping is required.

Figure 6:
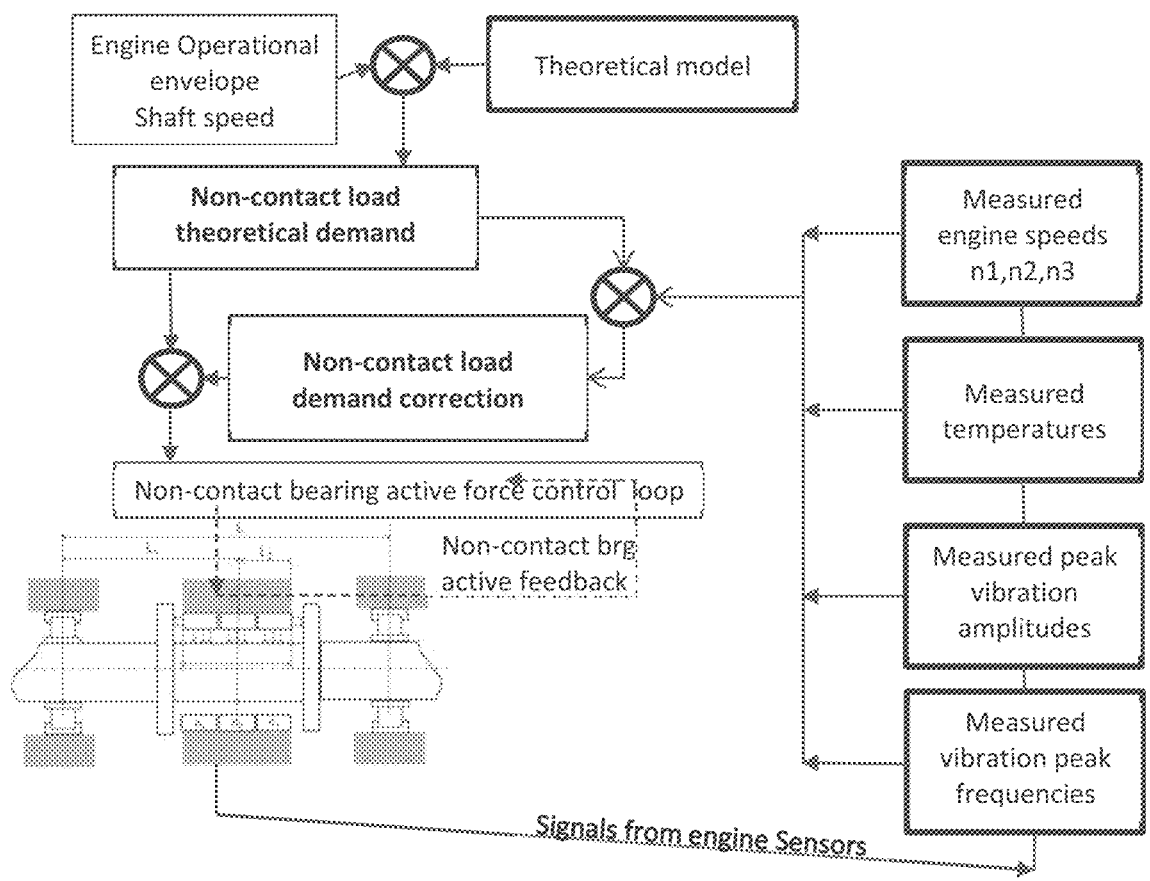
FIG. 6 is a flow diagram of a first method of controlling the bearing arrangement of any of FIGS. 3 to 5.

Referring to FIG. 6, the method operates as follows.

The control method uses a form of model based control, with an inner feedback loop to ensure safe operation.

In a first step, a predetermined residual peak vibration level J is determined, based on maximum vibrations that can be tolerated in service. This will be determined on a case-by-case basis for a given engine design type, depending on service life requirements, materials, driveline architecture etc. This may be determined by experimentation or simulation.

An engine operational model is then created, to determine a vibrational response (i.e. vibrational magnitude expected at the resonance peaks) of the engine as a function of input frequency (Hz), which is in turn related to a certain engine operational condition within the engine operational envelope (e.g. a current shaft speed within the range of possible shaft speeds). One or more peaks are determined within the model, which are representative of one or more natural frequency $f_n$. It is also known which engine operational conditions determine resonances with one or more of the natural frequencies $f_n$. A resonance detuning target frequency $\Delta f$ can then be determined for a given shaft rotational speed, which results in a residual vibration level below the predetermined level J at that speed, achieved by a predetermined natural frequency $f_n$ shift.

A required non-contact load modal (theoretical) demand (i.e. a restoring force magnitude) can then be calculated for a given engine operational condition, which is calculated to move the natural frequency fn away from the engine generated driving force by the resonance detuning target frequency shift $\Delta f$, such that the residual vibration level is below the predetermined level J, as a result of having brought the engine out of the resonance.

This required non-contact load modal demand is calculated on the basis of a natural frequency model, such as the following:

$$f_n = \frac{1}{2\pi}\sqrt{\frac{K_n + K_{nc}}{M_n}}$$

where fn is the system natural frequency, kn is the modal stiffness of the shaft 13 and the contact bearings 31,32, knc is the variable stiffness of one or more non-contact bearings at n locations (i.e. the required non-contact load modal demand), and $M_n$ is the modal mass of the shaft 13 and the contact bearings 31,32.

From the above model, a required theoretical non-contact load modal demand n can be calculated such that the natural frequency $f_n$ is moved from the engine operational condition by at least the resonance detuning target frequency shift $\Delta f$.

Optionally, an adaptive correction factor calculated upon the actual operation conditions may be applied. This correction factor is applied to account for engine-to-engine variation, and differences between the assumed engine speeds, clearances, temperatures and vibrations of the model.

In determining the correction factor one or more parameters of the bearing arrangement are sensed as inputs. Typically, these parameters include one or more shaft speeds and vibration. Where the parameters include shaft speeds, the sensed shaft speeds typically include at least the main shaft which is supported by the bearing arrangement, which in embodiment case is the low pressure shaft 23, which is sensed by speed sensor 42. This shaft speed is frequently referred to in the art as "n1". Further main shaft speeds n2, n3 may also be sensed. Where the engine has two main shafts, n2 represents the high pressure shaft 22 speed. Where the engine comprises three main shafts, n2 represents an intermediate pressure shaft speed, while n3 represents a high pressure shaft speed.

In the present embodiment, further parameters are also sensed in order to target the detuning of the resonance conditions. The parameters include measured temperatures at one or more locations by temperature sensors.

Vibrational parameters are also sensed by the vibration sensors 43. Inputs from the sensors 43 may be processed to determine measured peak vibration amplitudes (i.e. displacement amplitudes in, for example, a radial direction, from a mean position), and also one or more peak frequencies. The peak frequencies may be determined from the vibration data from a Fourier Transform analysis or similar analysis in the frequency domain, as would be understood by the skilled person.

Each of these parameters is then input to determine the correction factor to superimpose to the theoretical restoring non-contact force demand to produce an actual demand. For example, where the measured vibrations are still above the predetermined limit J, the non-contact restoring force demand is adjusted to reduce the vibration.

This modal load demand is then translated into a winding electrical power using a closed feedback loop. For example, the displacement 6 of the shaft 23 from the mean position is measured by the vibration/displacement sensors 43. The restoring force F provided by the non-contact bearings 34, 35, 36 is known from a look-up table or from sensitivity coefficients (i.e. a partial derivative of restoring force upon displacement, which relates electrical winding current (which is controlled by the controller 44) to restoring force F). The resultant non-contact stiffness can then be calculated from the following relation:

$$\partial K_{nc} = \frac{\partial F}{\partial \delta} \rightarrow \overline{K_{nc}} \frac{\overline{F}}{\overline{\delta}}$$

The calculated actual is then adjusted to correspond to the demanded by a conventional control loop, such as a PID (proportional, integral, differential) control scheme.

As a result of the positioning of the non-contact bearings 34, 35, 36 between two contact bearings, controlling the restoring force F will have the effect of adjusting the stiffness of the shaft 23.

Figure 8:
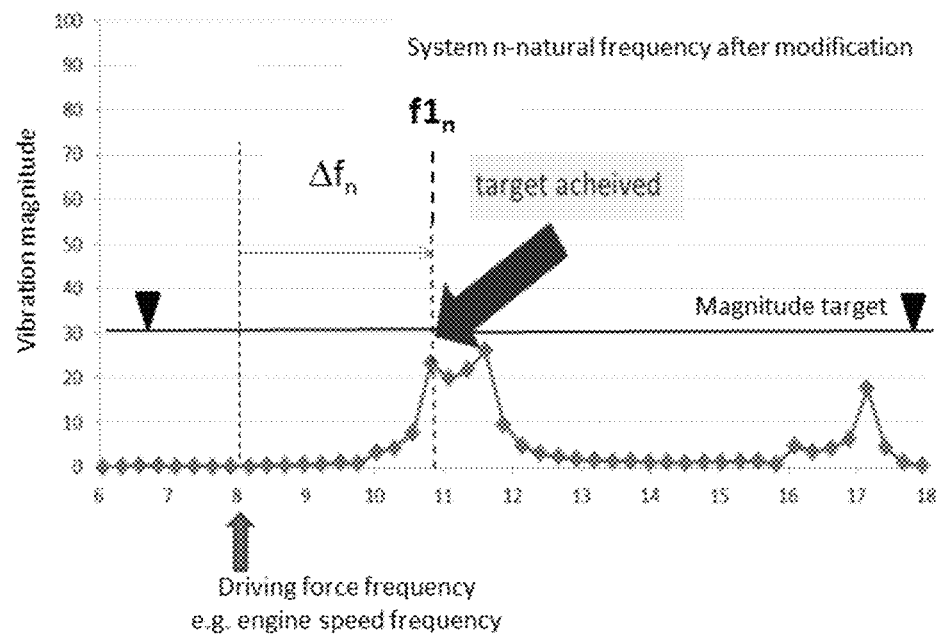
FIG. 8 is a graph showing vibration relative to shaft rotational speed after stiffness is modified.

FIG. 8 shows a graph of vibration relative to shaft speed once the above method has been applied to adjust the natural frequency of the system.

As can be seen, the natural frequency (shown by the peak in the graph) is now moved from the driving force frequency by the target frequency difference $\Delta f_n$. Similarly, the magnitude of the vibration has been reduced to a level below the target frequency.

It will be understood that different control schemes could be utilised to provide for control of the non-contact bearings 34, 35, 36. For instance, a fixed schedule could be defined, which relates shaft speeds to non-contact bearing restoring forces. Alternatively, shaft vibration could be measured, and the restoring force adjusted where the vibration level exceeds a predetermined level.

In general however, the control system acts over a time scale of greater than one revolution, and/or acts with equal force in all radial directions. In other words, the restoring force is approximately isotropic in a radial or axial plane. In contrast, damping systems seek to provide anisotropic forces, to directly oppose movement of the shaft, by acting in an opposite direction to a displacement.

The bearing arrangement 30 allows for further control, including multiple degrees of freedom to control stiffness. As will be understood by the skilled person, shaft stiffness is dependent on support radial stiffness, and shaft tension.

Bearing 36 is configured to provide a controllable radial restorative force to the shaft, and thereby control support radial stiffness. This can be achieved by arranging for the magnetic flux from the stator teeth 38 to be directed inwardly toward the shaft rotor laminations, as shown in FIG. 4.

On the other hand, bearings 34 and 35 are configured to provide controllable axial restorative force to the shaft in opposite directions, and thereby control shaft axial tension. This can be achieved by arranging for the magnetic flux from the stator teeth of the bearings 34, 35 to be directed axially toward a shaft rotor lamination which projects radially from the shaft 23.

Figure 5:
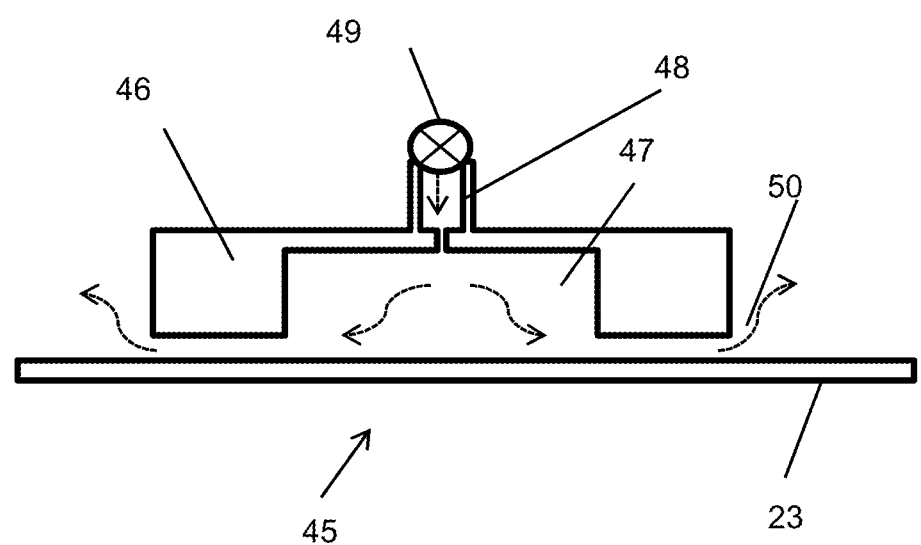
FIG. 5 is a sectional side view of part of an alternative bearing arrangement comprising an air bearing.

The disclosed arrangement and control methodology can be applied to different non-contact bearing types. FIG. 5 shows a non-contact bearing in the form of an air bearing 45, which could be substituted for one or more of the magnetic bearings 34, 35, 36.

The air bearing 45 comprises a bearing body 46, which is spaced from the shaft 23, and defines a cavity 47 within. The cavity 47 is open to the shaft 23, to define an air gap. The cavity 47 is filled with pressurised air from an air source such as the compressor 14 through an air inlet 48. The pressure and/or flow rate of air is controlled by a valve 49. Air outlets 50 adjacent the shaft 23 allow air to escape. Pressure within the cavity 47 and the outlets 50 provide a restorative force, which centres the shaft 23 without any of the bearing 45 components coming into physical contact with the shaft 23.

The air bearing 45 can be controlled in accordance with the control methodology of either of FIG. 6 or 7 to achieve a similar effect.

Advantageously, the invention provides for control of system resonances, to reduce machine vibration in use. In practical terms, this may result in the reduction or elimination of "keep out zones", which may result in increased operational flexibility.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the system could comprise one or more air bearing and one or more magnetic bearing in combination. Similarly, it will be understood that the system could be applied to machines other than gas turbine engines.

The invention claimed is:
1. An arrangement comprising:
a shaft;
at least one contact bearing and at least one non-contact bearing having a variable stiffness, the shaft being supported by and radially fixed by being in physical contact with the at least one contact bearing; and
a controller configured to:
receive signals corresponding to at least one sensed parameter of the shaft, wherein said at least one sensed parameter includes speed of the shaft,
determine a resonance detuning target frequency f1n based at least on the at least one sensed parameter,
calculate a restoring stiffness K1ln of the at least one non-contact bearing from

$$f_n = \frac{1}{2\pi}\sqrt{\frac{K_n + K_{nc}}{M_n}},$$

where $K_n$ is a modal stiffness of the shaft and the at least one contact bearing and $M_n$ is modal mass of the shaft and the at least one contact bearing, and
control a restoring force applied to the shaft by changing the variable stiffness of the at least one non-contact bearing to the restoring stiffness.

2. The arrangement according to claim 1, wherein the at least one contact bearing comprises one of a journal bearing and a rolling bearing.

3. The arrangement according to claim 2, wherein the rolling bearing comprises one or more of a roller bearing, a ball bearing, a spherical bearing and a taper bearing.

4. The arrangement according to claim 1, wherein the at least one non-contact bearing comprises a magnetic bearing.

5. The arrangement according to claim 4, wherein the controller is configured to control voltage and/or current through one or more bearing magnetic windings to control the restoring force.

6. The arrangement according to claim 1, wherein the at least one non-contact bearing comprises an air bearing.

7. The arrangement according to claim 6, wherein the controller is configured to control air pressure and/or air flow to control the restoring force.

8. The arrangement according to claim 1, wherein the at least one sensed parameter comprises one or more of a shaft displacement and a shaft rotational or vibrational frequency.

9. The arrangement according to claim 1, wherein the at least one sensed parameter comprises a vibrational displacement of the shaft.

10. The arrangement according to claim 9, wherein the controller is configured to alter the restoring force to a value that results in a minimum vibrational displacement.

11. The arrangement according to claim 1, wherein the at least one non-contact bearing includes two or more non-contact bearings that are located at different positions along the shaft.

12. The arrangement according to claim 1, wherein the at least one contact bearing includes two or more contact bearings that are located at different positions along the shaft and at least one of the at least one non-contact bearing is provided at a position between two contact bearings of the two or more contact bearings.

13. A gas turbine engine comprising the bearing arrangement in accordance with claim 1.

14. The gas turbine engine according to claim 13, wherein the engine comprises at least one compressor and at least one turbine interconnected by a main engine shaft, wherein the main engine shaft comprises the shaft of the arrangement.

15. The gas turbine engine of claim 13, wherein the resonance detuning target frequency f1n is further based on an engine operational condition.

16. A method of controlling a bearing arrangement supporting a shaft, the bearing arrangement comprising at least one contact bearing arranged to support and radially fix the shaft by being in physical contact with the shaft, and at least one non-contact bearing having a variable stiffness, the method comprising:
sensing at least one parameter of the shaft, wherein said at least one sensed parameter includes speed of the shaft,
determining a resonance detuning target frequency $f_{1n}$ based at least on the at least one sensed parameter,
calculating a restoring stiffness $K_{nc}$ of the at least one non-contact bearing from $$f_{1n} = \frac{1}{2\pi}\sqrt{\frac{K_n + K_{nc}}{M_n}},$$

where $K_n$ is a modal stiffness of the shaft and the at least one contact bearing and $M_n$ is modal mass of the shaft and the at least one contact bearing, and
controlling a restoring force applied to the shaft by changing the variable stiffness of the at least one non-contact bearing to the restoring stiffness.

* * * * *